US007827034B1

(12) United States Patent
Munns

(10) Patent No.: US 7,827,034 B1
(45) Date of Patent: *Nov. 2, 2010

(54) TEXT-DERIVED SPEECH ANIMATION TOOL

(75) Inventor: William H. Munns, Woodland Hills, CA (US)

(73) Assignee: TotalSynch, LLC, Lake Forest, CA (US)

( * ) Notice: Subject to any disclaimer, the term of this patent is extended or adjusted under 35 U.S.C. 154(b) by 133 days.

This patent is subject to a terminal disclaimer.

(21) Appl. No.: 11/952,005

(22) Filed: Dec. 6, 2007

Related U.S. Application Data

(63) Continuation-in-part of application No. 10/306,778, filed on Nov. 27, 2002, now Pat. No. 7,315,820.

(60) Provisional application No. 60/873,357, filed on Dec. 6, 2006.

(51) Int. Cl.
*G10L 21/00* (2006.01)

(52) U.S. Cl. ...................................... 704/275
(58) Field of Classification Search .................. 704/275
See application file for complete search history.

(56) References Cited

U.S. PATENT DOCUMENTS

| 5,608,839 | A | * | 3/1997 | Chen ........................... 704/235 |
| 5,682,196 | A | | 10/1997 | Freeman |
| 5,689,618 | A | * | 11/1997 | Gasper et al. ............... 704/276 |
| 5,880,788 | A | | 3/1999 | Bregler |
| 6,181,351 | B1 | | 1/2001 | Merrill et al. |
| 6,208,356 | B1 | * | 3/2001 | Breen et al. ................. 345/473 |
| 6,232,965 | B1 | * | 5/2001 | Scott et al. .................. 715/203 |
| 6,363,342 | B2 | | 3/2002 | Shaw et al. |
| 6,433,784 | B1 | | 8/2002 | Merrick et al. |
| 6,539,354 | B1 | * | 3/2003 | Sutton et al. ................ 704/260 |
| 6,697,120 | B1 | | 2/2004 | Haisma et al. |

(Continued)

OTHER PUBLICATIONS

Cheung et al., Text-driven Automatic Frame Generation using MPEG-4 Synthetic/Natural Hybrid Coding for 2-D Head-and-Shoulder Scene, 1997, vol. 2, pp. 69-72.*

*Primary Examiner*—Jakieda R Jackson
(74) *Attorney, Agent, or Firm*—Stout, Uxa, Buyan & Mullins, LLP; Donald E. Stout

(57) ABSTRACT

A text-derived speech animation software tool for producing simple, effective animations of digital media content that educate, entertain, and inform viewers by the presentation of speaking digital characters. The invention makes the creation of digital talking characters both easy and effective to produce by operating at the syllable level. The inventive device includes the Main Screen, the Dialogue Editing Screen, the Character Options, and the Phonetic Dictionary Editor. Main component 1 is the software user interface of the main program screen, and allows users to operate the essential controls to produce an animated speaking character. Commands and data input by the user from a keyboard or mouse-type device will be utilized by the Main Screen controls to generate the animation. The Dialogue Editing Screen is the expanded display of all the tools and variables the user has to create and edit the dialogue. The Character Options is the program component that allows users to select existing characters, modify them, import new characters for use, and assign a specific voice to the character. The Phonetic Dictionary Editor is the component that assists users in adding new words to the program dictionary for use in this program.

12 Claims, 16 Drawing Sheets

Schematic

U.S. PATENT DOCUMENTS

| | | |
|---|---|---|
| 6,766,299 B1 | 7/2004 | Bellomo et al. |
| 7,353,177 B2 * | 4/2008 | Cosatto et al. ............... 704/275 |
| 2002/0091713 A1 * | 7/2002 | Walker ....................... 707/200 |
| 2003/0033149 A1 * | 2/2003 | Milligan et al. .............. 704/275 |
| 2003/0040916 A1 | 2/2003 | Major |
| 2003/0137516 A1 * | 7/2003 | Harvill et al. ................ 345/473 |
| 2004/0064321 A1 * | 4/2004 | Cosatto et al. ............... 704/276 |

\* cited by examiner

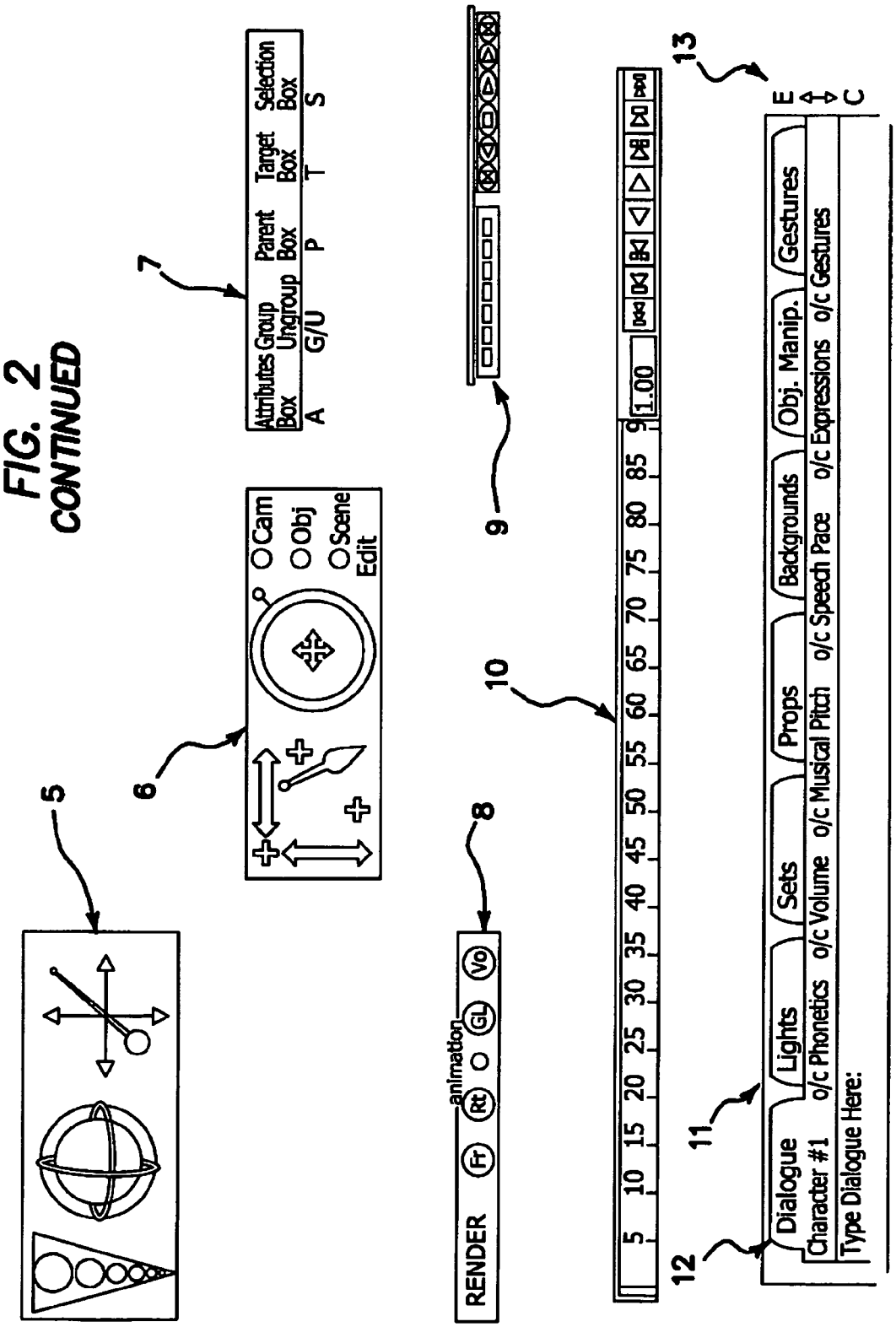

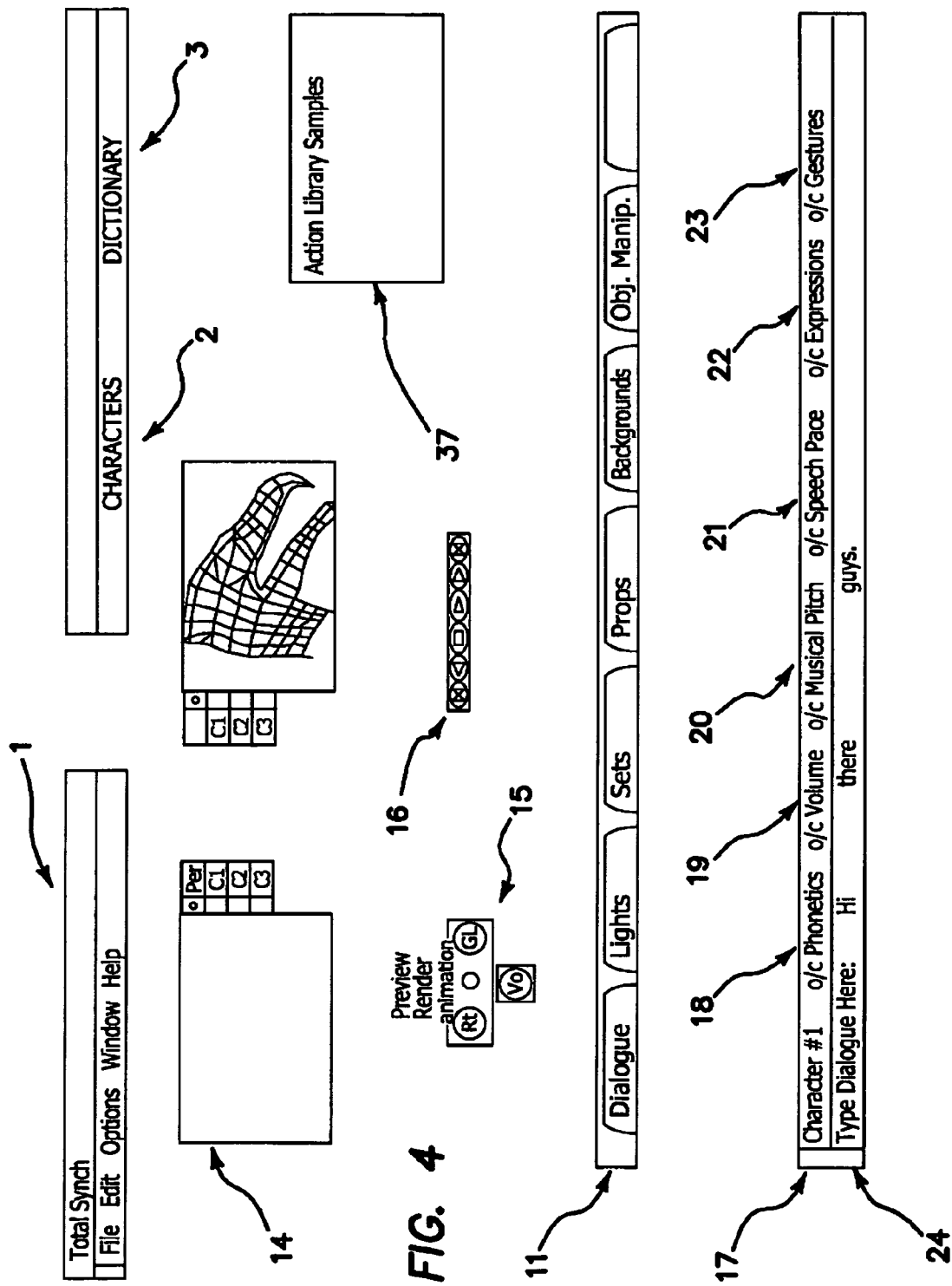

Schematic

Fig. 10 - Mouth, jaw & tongue positions

Fig. 10A - Mouth, jaw & tongue positions positions described in detail

Mouth Base - mouth closed and relaxed
M1 - mouth closed, corners pursed together
M2 - mouth closed, lips rolled inward
M3 - mouth closed, corners stretched
M4 - mouth open widest
M5 - Mouth open with slight corner pulls
M6 - mouth open, corners pulled out and up
M7 - mouth open, corners pulled out and down
M8 - mouth pursed or puckered for kiss
M9 - mouth puckered but open, lips thrust out
M10 - mouth open and lower lip hanging loosely down
M11 - lower lip rolled up under upper lip
M12 - lower lip thrust outward beyond upper lip
M13 - upper lip tucked into extended lower lip
M14 - mouth closed, viewer left corner stretched asymmetrically
M15 - mouth closed, viewer right corner stretched asymmetrically
M16 - mouth open on viewer left only
M17 - mouth open on viewer right only Jase base - teeth together
J1 - jaw rotated open Tongue Base - resting low and back in lower jaw
T1 - tongue forward and higher, but still behind teeth
T2 - tongue up to roof of mouth
T3 - tongue thrust out beyond teeth

Surface Mesh Object

TEXT-DERIVED SPEECH ANIMATION TOOL

This application claims the benefit under 35 U.S.C. 119(e) of the filing date of Provisional U.S. Application Ser. No. 60/873,357, entitled Text-Derived Speech Animation Tool, and filed on Dec. 6, 2006, which application is expressly incorporated herein, in its entirety, by reference. This application is also a continuation-in-part under 35 U.S.C. 120 of U.S. Application Ser. No. 10/306,778, entitled Text-Derived Speech Animation Tool and filed on Nov. 27, 2002, which application is herein also expressly incorporated, in its entirety, by reference.

BACKGROUND OF THE INVENTION

The present invention relates generally to lip sync animation software tools and more specifically it relates to a text-derived speech animation tool for producing simple, effective animations of digital media content that educate, entertain, and inform viewers by the presentation of speaking digital characters. The invention makes the creation of digital talking characters both easy and effective to produce with professional quality and realism.

It can be appreciated that lip sync animation tools have been in use for years. Typically, prior art such as Bellomo et al. (U.S. Pat. No. 6,766,299) and Major (U.S. Published Application No. 2003/0040916), and the HIJINX product cited in Bellomo et al., exemplify the more relevant prior art, along with such animation lip-sync software products as MORPH MAGIC (for 3D Studio Max), MORPH GIZMO (for Lightwave), SHAPE SHIFTER (for Power Animator), MIMIC (made by Lip Sinc Co.), SMIRK (made by Lambsoft Co.), FAMOUS FACE (made by Famous Technology Co.), TALKMASTER (made by Comhertz Co.), and AUTOMATIC LIPSYNC (made by Fluent Speech Technologies Co.). Existing products generally can be divided into three categories, and problems with each are best described in relation to each category. The first category (A) are manual lip syncing products which generally require digital artists to manually adjust individual controls for aspects of a character mouth to sync up the animation of character lips to a pre-recorded sound voice track. Every new speech to be animated requires the same manual construction of animation information to attempt to synchronize with the voice track. The second category (B) are voice-driven products where a character animation of lip sync is automatically constructed from a processed analysis of the recorded speech of a real person. The third category (C) of products are text-driven speech animation programs, where a digital artist enters text as dialogue for the characters and the product automatically generates both a speech animation of the character and a sound dialogue track of the character voice.

The main problem with conventional lip sync animation tools are the complexity of trying to sync up lip motions to speech in a conscious manner, when in reality (as you speak), the lip motion is a totally unconscious and automatic derivative result of the intent to vocalize words. Category (A) products are most prone to this problem. The user of these products must try to consciously and logically do something which is fundamentally sub-conscious, automatic and never thought about in real life. In real life, real people speaking have the mouth motions and the voice result interlocked by their functional relationship (mouth postures create the acoustics from which speech sounds derive) whereas in digital animation processes, the recorded voice has no inherent connection to mouth animation, and so a connection must be built by a digital artist. The process is also time consuming, and changes in the speech content (the audio recording of the speech) require extensive efforts to modify the animation accordingly.

Another problem with conventional lip sync animation tools are the separation of the processes for generating the voice recording and performing the facial animation. Both Category (A) and (B) type products are prone to this problem. A voice talent person is recorded speaking the desired dialogue. This is done in a recording studio with professional audio recording specialists, equipment and facilities. The voice recording is then given to digital artists to use to create the facial animation. If at a later point in time, there is a desire or need to alter the dialogue content for any reason, the entire process of bringing voice talent into a recording studio must be repeated before the digital artist has a new sound track to work with to produce the new animation sequence. By making the voice recording a completely separate process requiring separate equipment, facilities and skilled employees, the digital animation process is unnecessarily complicated.

Another problem with conventional lip sync animation tools are the structure of the speech processing. Both Category B and C products are most prone to this problem. Products in these categories currently use an unnatural division of sound components (phonemes) to process a voice recording (category B products) or translate text into synthesized speech (type C products), as their operational system. Speech may be divided or broken down into phoneme modules (fundamental speech sounds) or syllabic modules (the syllables people actually use in real speech). A phoneme-based process is simpler in that there are less phonemes than syllables in speech, but the result is unnatural because real speech is syllabic and all dramatic quality and character of human speech derives from modulation, emphasis, and pace of the syllables, not the phonemes.

To properly appreciate the uniqueness of the invention, a detailed discussion of phonemes is appropriate. Phonemes were developed by linguists and speech pathologists over a century ago as a way of dissecting speech into audible base components, to allow speech patterns, languages, and dialects to be studied in a precise academic way. It is a system based heavily on the audible aspects of speech, and only marginally included basic references to mouth shapes as they relate to the audible elements (such as classifying some sounds as "closed consonants" because the sound must be formed with an action of closing the lips, or a plosive sound which is created by a rapid opening and thrusting of the lips). But these lip postures and motions were greatly simplified because the scholars of the time had no capacity to record the full range of motion and had no particular concern for studying the minute subtleties of the lip motions. One generalized posture sufficed for their academic purposes.

But the phoneme system was never intended as a method of reconstructing lifelike lip animations for physical robotic and digitally embodied characters. No attention was paid to the true range of lip motions and postures because the phoneme studies only applied to helping other humans talk correctly, not helping artificial character entities talk correctly, and humans are taught to speak primarily by comparing the sound their lips make to a reference sound of word pronouncement. So a linguist or speech pathologist helps a real person learn to move the lips correctly mainly by helping the person form the correct audible sound. Again, the emphasis is on the audible and correct lip motions tend to result if the audible sounds are formed correctly.

But a robotic or digitally animated character has no capacity to form sounds in and of itself. There is no acoustic relationship between it's mouth postures and the spoken audio track. So whereas teaching a human to speech with correct pronunciation can be well accomplished using phonemes, the phoneme system fails to achieve anything close to perfection when teaching or programming a robotic or digitally animated character to speak with true realistic lip sync motions, because the phoneme system was never designed or intended for this application. The detail in which the audio components were studied and categorized was never matched with an equally detailed study and documentation of how the lips move every ¹/₂₄th of a second (one film frame duration in a film sequence) through the speech cycle.

Phoneme systems intended for digital character animation are inherently flawed by this fact. They were applied to robotic and digital character speech animation because the phoneme data set is a much smaller database than syllabic data sets, and early developers needed the smaller databases to operate in the early digital systems with slow processor speeds and limited RAM. Further, the phoneme system had the apparent respectability of time honored academic use, despite the fact that in truth, the phoneme system was never intended for this application (to reconstruct lip sync motions in artificial entities appearing to talk like humans) and thus never fully developed for this purpose.

Humans speak in syllables, a group of sounds enfolded in one expulsion of breathe. All modulations of volume, pitch change, pace and fluidity that give human speech its dramatic presentation are based on syllabic emphasis.

The phoneme system dissects speech below the syllable level, losing the syllable structure in the process, and by losing the syllable structure, the phoneme system does lose the capacity to replicate human speech in its most natural form.

Using the word "master" as an example of how the phoneme system breaks the word down into five component phonemes "m" "ah" "ss" "tah" "er", while the syllabic system breaks the word down into only two syllables, "mah" and "stir". True lip motions to form sounds flow fluidly throughout the syllable being spoken, and dividing the motions into phoneme components isolates the motions, making the transition from one to the next abrupt and discontinuous.

While these devices may be suitable for the particular purpose to which they address, and for cartoonish levels of realism, they are not as suitable for producing truly realistic, effective animations of digital media content that educate, entertain, and inform viewers by the presentation of speaking digital characters. What is lacking is the ability of such systems to reliably produce the full natural range of speech mouth motions, match the audible component with motions accurate to ¹/₂₄th of a second, and as well demonstrate potential to replicate the irregularities of actual speaking mouths (such as asymmetrical mouth postures).

Further, phoneme-based systems such as Bellomo tend to place static mouth posture markers at intervals on the processed speech track, and then rely upon algorithmic formulas for generating curves from varied points to produce the final motion graphs that determine the mouth posture at every ¹/₂₄th of a second frame render of the animation. But these algorithmically generated curves do not correctly replicate the true mouth motions, which do not follow algorithmic protocol. True mouth movements of humans speaking follow different protocols of motion and priority based on the entire syllable of sound to be spoken, the relation of vowels before and after a consonant, and the degree of clarity and enunciation the speaker applied to the intent to speak. These multiple mitigating factors cannot be boiled down to a simplistic algorithmic formula of blending curves. So any prior art, such as Bellomo et al., is inherently compromised by the implementation of static markers of mouth shape placed in a timeline and blended by artificial protocols.

The invention takes full syllables of spoken sound and adds full motion graphs, sampled from real human speech motion and modified to include the motions of jaw and tongue (which motion capture cannot record) and interlocks these tested and verified full motion graphs (of the most realistic mouth motions to say the given syllable of speech) with the audio file of the spoken syllable. Once interlocked, the speech sound and mouth motion are in perfect sync and preserved as such throughout all use of the invention.

The invention makes the creation of digital talking characters both easy and effective to produce while operating at the syllabic level, which is the most natural operating structure to replicate true human speech. No prior art does this. The invention further takes human lip motions appropriate for perfect lip sync and interlocks those motions with the vocal audio sound tracks, in a manner that ensures they stay in sync when operated upon by the software user to create a specific animation project.

In these respects, the text-derived speech animation tool according to the present invention substantially departs from the conventional concepts and designs of the prior art, in workflow, tools, intuitive operations, and output results. In so doing, this invention provides an apparatus primarily developed for the purpose of producing realistic, dramatically entertaining, and humanly varied character animations where a digital character must speak with perfect lip sync, to enhance the believability of that character.

SUMMARY OF THE INVENTION

In view of the foregoing disadvantages inherent in the known types of lip sync animation tools now present in the prior art, the present invention provides a new text-derived speech animation tool construction wherein syllabic operations replace phoneme operations, audio tracks of human speech are fully interlocked with the necessary motion graphs representing true natural mouth motions that accompany human speech, and all editing operations effected by the invention user to create a specific and unique dramatic speaking character animation never disconnect the lip synced speech (audio) and lip motions (animations) that the invention provides as the operational foundation (thus the character mouths never go out of sync).

The general purpose of the present invention, which will be described subsequently in greater detail, is to provide a new text-derived speech animation tool that has many of the advantages of the lip sync animation tools mentioned heretofore and many novel features that result in a new text-derived speech animation tool which is not anticipated, rendered obvious, suggested, or even implied by any of the prior art lip sync animation tools, either alone or in any combination thereof.

A schematic representation of the fundamental operational process is illustrated in FIG. 8. It is meaningful to note that the true creative endeavor of this application works within the process, once a user enters the desired text words to be spoken, whereas other patents like Bellomo and Major require the true creative endeavor (the determination of how the character talks for a unique dramatic result) to occur immediately in the recording session which precedes the processing aspects of the workflow. This is significant, because if in the process of creating the character animation, the user desires to revise any word or words in the speech, the user of this invention simply deletes the unwanted words and types new words in and continues editing the speech for dramatic effect, while using the Bellomo or Major system, changing a word requires scraping the entire effort and going back to square one, a new recording session.

Now, to describe how this invention operates, one general embodiment will be described, as follows. In this illustrative embodiment, the present invention generally comprises a Main Screen, a Dialogue Editing Screen, a Character Option, and a Phonetic Dictionary Editor. The main component is the software user interface of the main program screen, and allows users to operate the essential controls to produce an animated speaking character. Commands and data input by the user from a keyboard or mouse-type device will be utilized by the Main Screen controls to generate the animation. The Dialogue Editing Screen is the expanded display of all the tools and variables the user has to create and edit the dialogue. The Character Options is the program component that allows users to select existing characters, modify them, import new characters for use, and assign a specific voice to the character. The Phonetic Dictionary Editor is the component that assists users in adding new words to the program dictionary for use in this program.

The syllable module (shown on the Dialogue Editing Screen) is a representation of a data file which contains both an audio file of human speech saying a specific syllable, and a set of animation motion graphs representing the motions of the mouth, jaw and tongue necessary to create a realistic character mouth motion a viewer will believe is in perfect sync with the audio track. The audio speech track and the motion graphs are grouped in such a manner that any operation on the module equally operates on the components of the module, so stretching duration (time shift) for example, equally stretches the audio track and the motion graphs.

There has thus been outlined, rather broadly, the more important features of the invention in order that the detailed description thereof may be better understood, and in order that the present contribution to the art may be better appreciated. There are additional features of the invention that will be described hereinafter.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a text-derived speech animation tool that will overcome the shortcomings of the prior art devices, by operating at the natural syllabic level instead of the unnatural phoneme level prior art relies upon.

An object of the present invention is to provide a text-derived speech animation tool for producing simple, effective animations of digital media content that educate, entertain, and inform viewers by the presentation of speaking digital characters. The invention makes the creation of digital talking characters both easy and effective to produce, by making the user editing process similar to the process a person would use to instruct a real person in how to speak dramatically.

Another object is to provide a text-derived speech animation tool that allows users to create digital animated characters talking realistically from the simple introduction of text (written dialogue) and the simple editing of speech parameters (volume, pace, emphasis and inflection) in the same syllabic form that people consciously and intuitively do when they speak themselves.

Another object is to provide a text-derived speech animation tool that allows users to select from a database of existing characters if the user does not have the separate skills and tools to model and texture a digital character of their own design, or to easily add character models of their own design to the program if the user has tools for modeling and texturing.

Another object is to provide a text-derived speech animation tool that allows users to easily record new character voice samples of their preference (such as their own voice) into the program in a way that assures these new voice samples will easily and fully integrate with the functionality of the program.

Another object is to provide a text-derived speech animation tool that allows users to export the animation data and voice track to all other digital animation tools, as well as use such data and tracks in our product. Other animation packages have tools for character body animation, object animation, and particle animation beyond the specialized capability of our product, but our superior method of lip sync can be utilized in these other programs to improve their effectiveness in speech animation.

Other objects and advantages of the present invention will become obvious to the reader and it is intended that these objects and advantages are within the scope of the present invention.

The invention, together with additional features and advantages thereof, may best be understood by reference to the following description taken in conjunction with the accompanying illustrative drawing.

BRIEF DESCRIPTION OF THE DRAWINGS

FIG. 10A is a description list of the mouth, jaw, and tongue postures illustrated in FIG. 10.

DESCRIPTION OF THE PREFERRED EMBODIMENT

Figure 1:
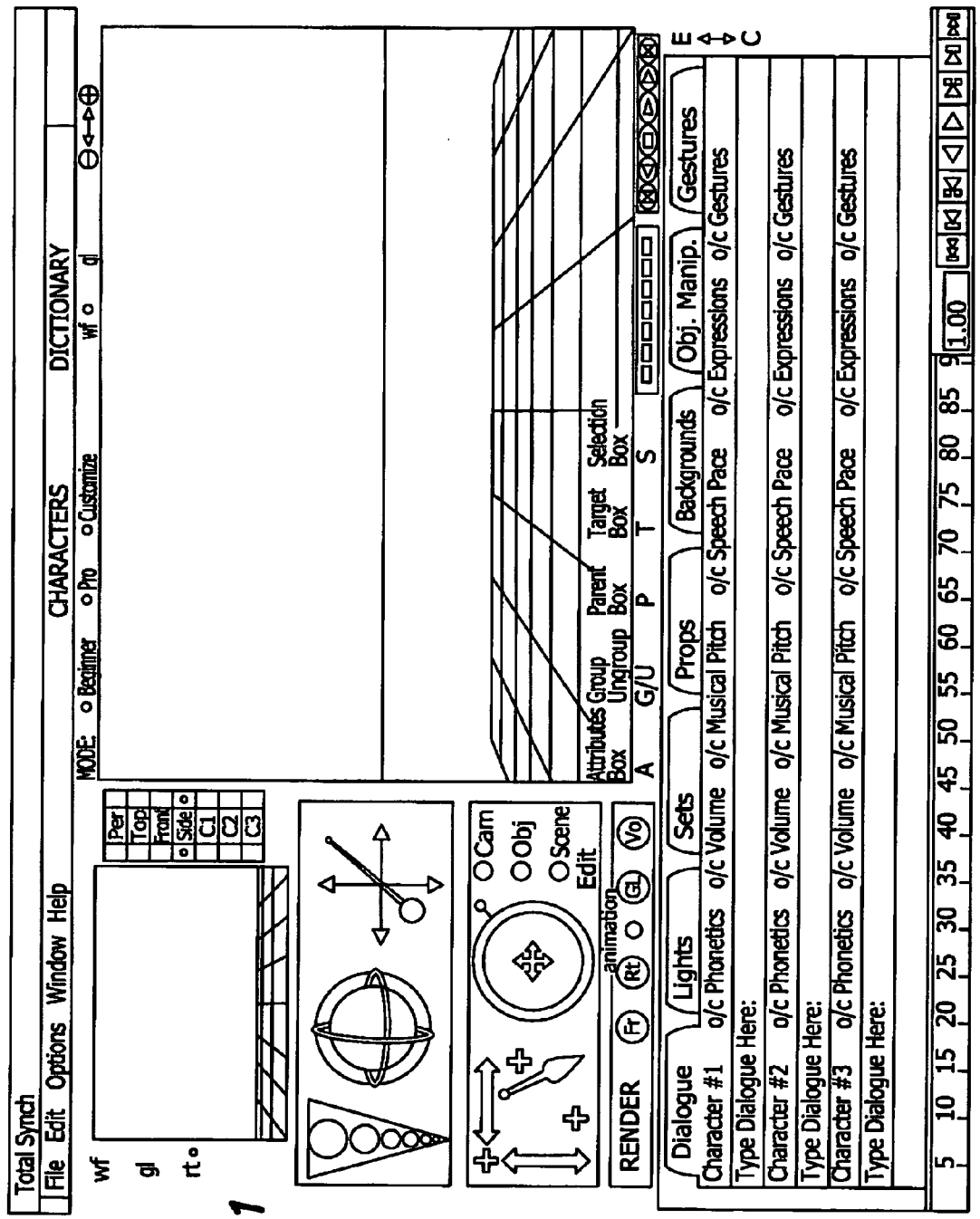
FIG. 1 is the Main Screen as seen by the User.

Turning now descriptively to the drawings, in which similar reference characters denote similar elements throughout the several views, the attached figures illustrate a text-derived speech animation tool, which comprises the Main Screen, the Dialogue Editing Screen, the Character Options, and the Phonetic Dictionary Editor. Main component 1 is the software user interface of the main program screen, and allows users to operate the essential controls to produce an animated speaking character. Commands and data input by the user from a keyboard or mouse-type device will be utilized by the Main Screen controls to generate the animation. The Dialogue Editing Screen is the expanded display of all the tools and variables the user has to create and edit the dialogue. The Character Options is the program component that allows users to select existing characters, modify them, import new characters for use, and assign a specific voice to the character. The Phonetic Dictionary Editor is the component that assists users in adding new words to the program dictionary for use in this program.

Figure 2:
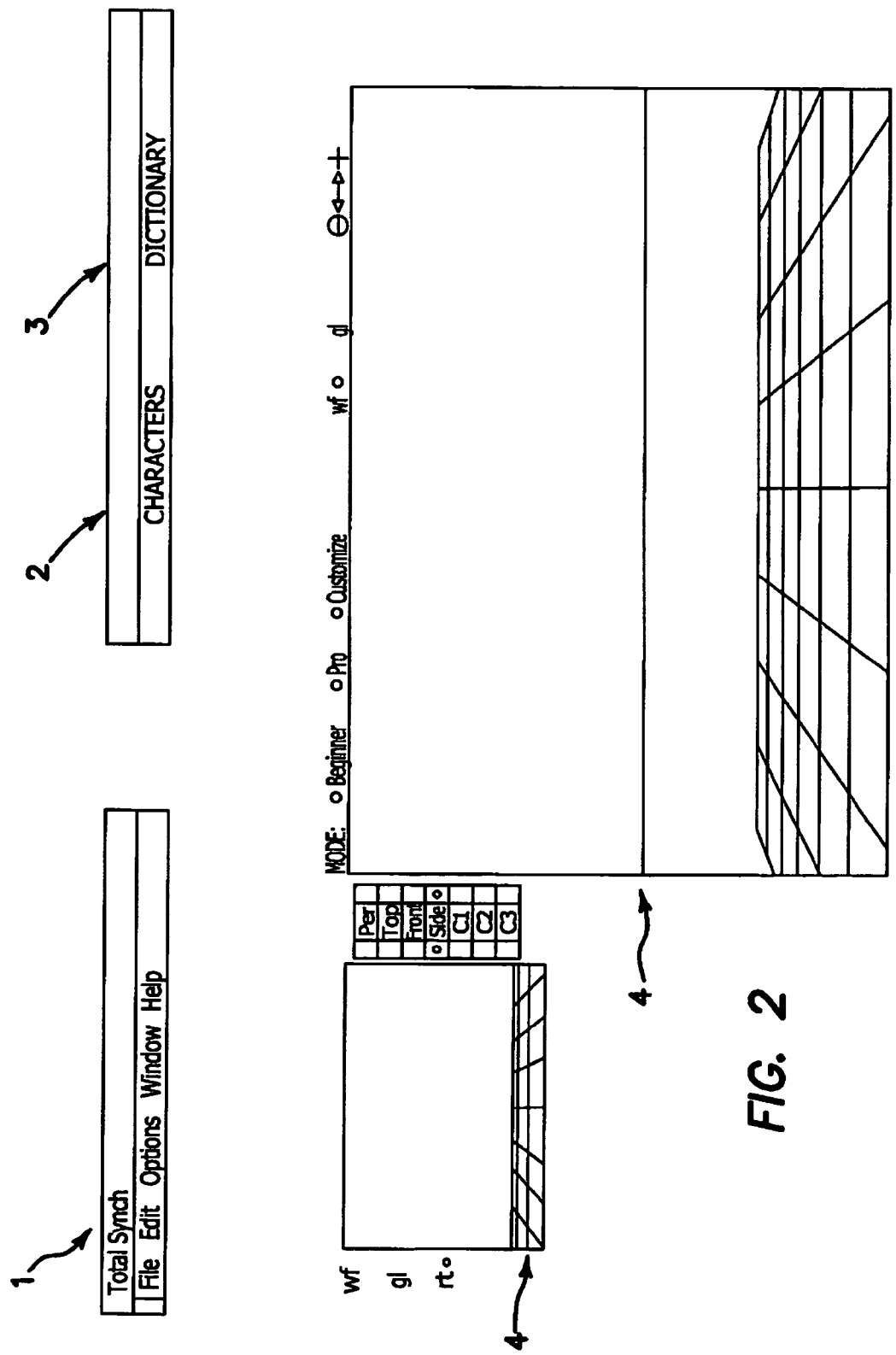
FIG. 2 is the Main Screen exploded for identification of parts.
Figure 3:
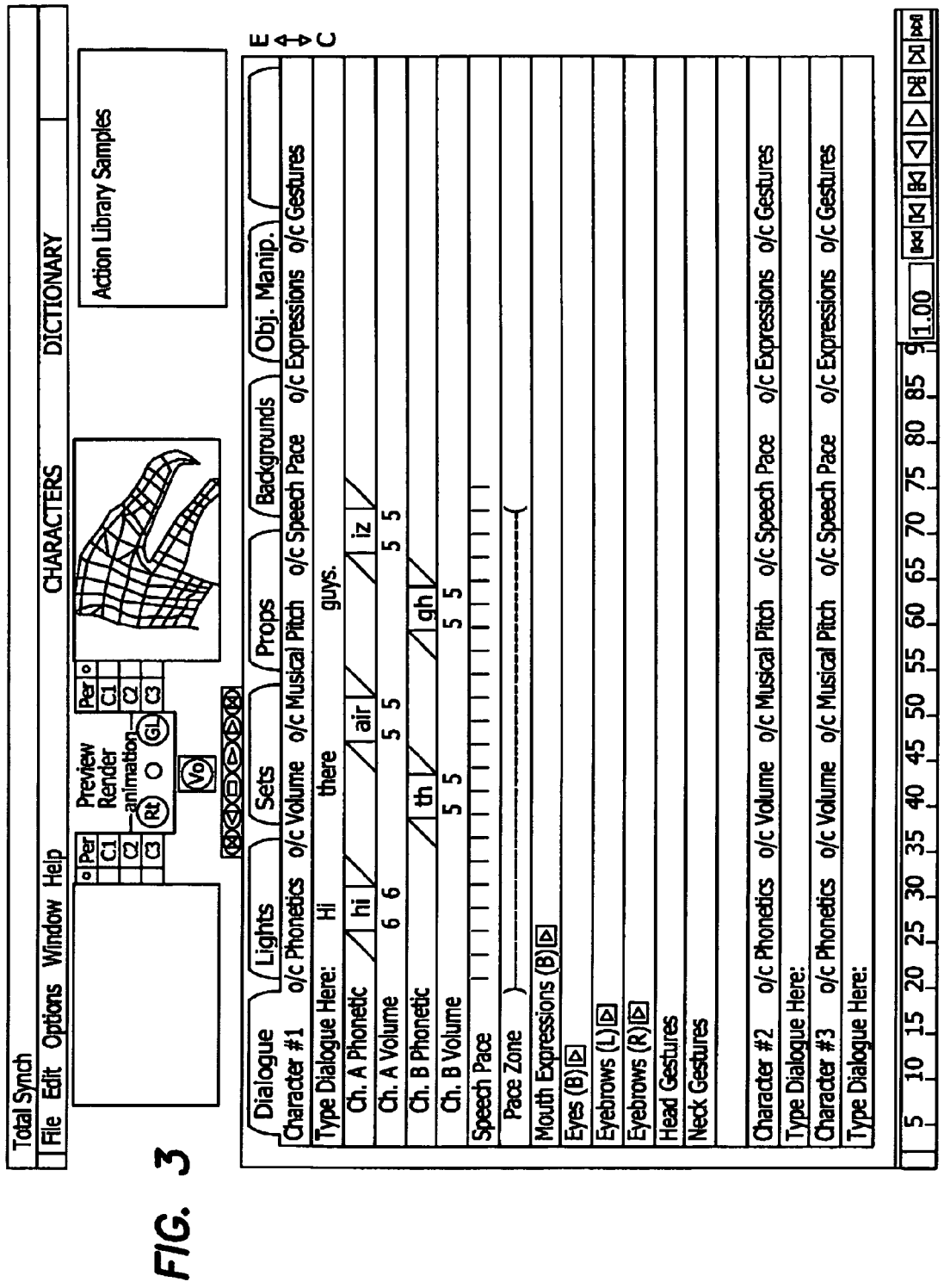
FIG. 3 is the Dialogue Editing Component as seen by the User.
Figure 4:
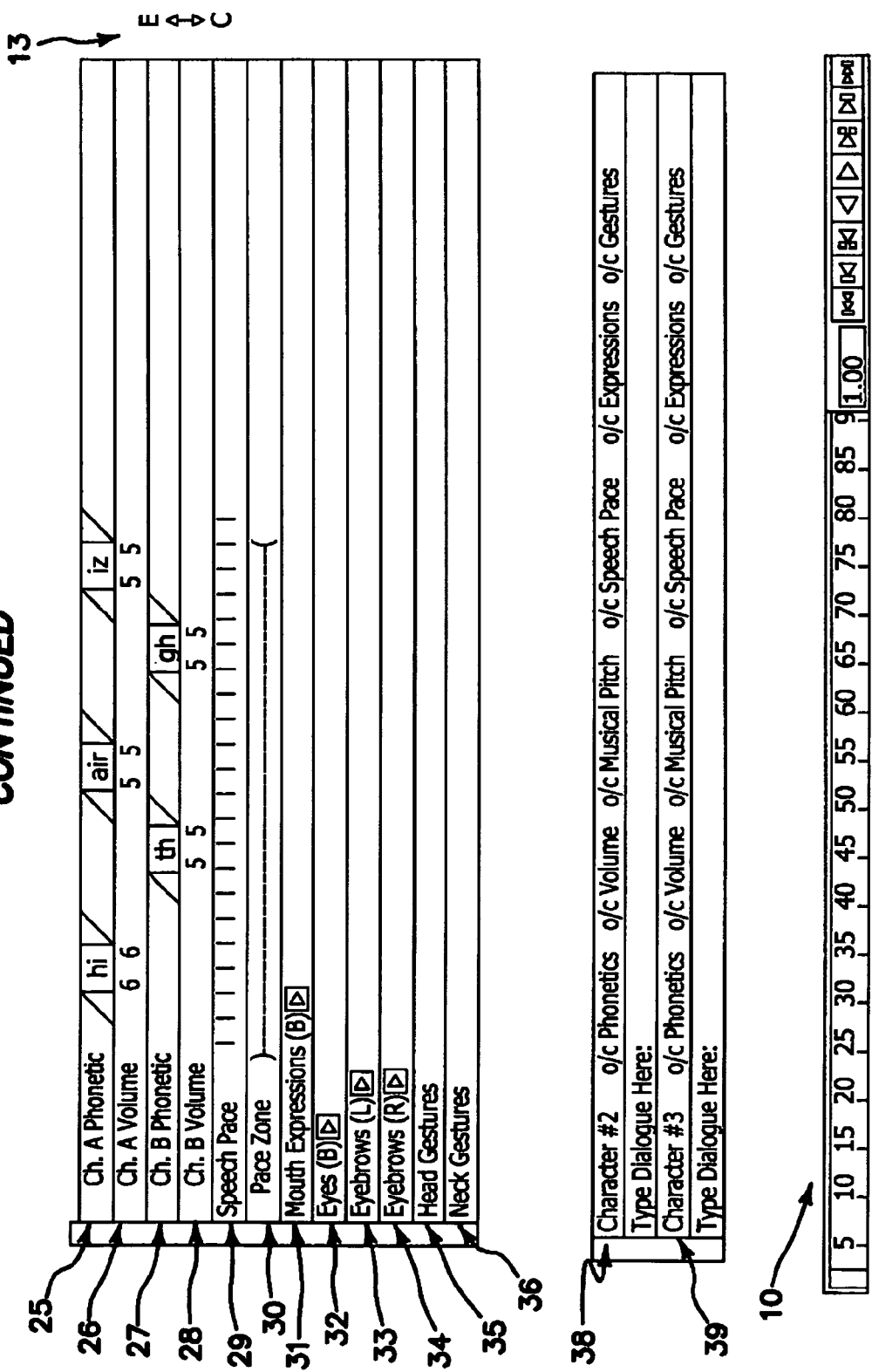
FIG. 4 is the Dialogue Editing Component exploded for identification of parts.

Main component 1 is the software user interface of the main program screen, and allows users to operate the essential controls to produce an animated speaking character. Commands and data input by the user from a keyboard or mouse-type device will be utilized by the Main Screen controls to generate the animation. The Main Screen is the primary working window of this software program. Users will see this screen when they launch the program on their computer. Actual operation is by traditional computer processes and devices, including keyboard entry for letters, numbers, text and command shortcuts. Mouse-type cursor controllers can click on screen icons to activate, double-click, click-drag, and right-click in traditional manners. FIG. 1 illustrates the screen as seen by the user. FIG. 2 illustrates the Main Screen exploded to isolate groups of controls and allow for labeling these controls to reference the explanations in this patent document.

Basic Operating System tools 1 are the basic commands and procedural options of the operating system the computer is configured for (Win, Mac, Linux, Unix, etc.) Character 2 is the link to the Character Options and Dictionary 3 is the link to the Phonetic Dictionary. View Screens and Controls 4 are the elements which actually display the chosen character from a specific camera point of view, and allow the user to set preferences for this display. Object manipulation controls 5 are the tools that allow the user to position the character in the scene for a specific visual composition. Camera manipulation controls 6 allow the user to move or position the camera in the scene to frame the character(s) and scenic elements in a particular visual composition. Object options 7 are tools to allow the user to assign attributes to the characters or other scene objects which facilitate the process of creating the animations. Animation Render Controls 8 are the tools that allow the user to determine and initiate a specific type of render or visual compilation of the scene into a finished still image or finished animation sequence for inspection or for completion of the job. Animation Playback Controls 9 allow the user to control playback of any rendered animation by standard VCR type functions (PLAY, STOP, FAST FORWARD, REWIND, PAUSE, etc.) The Timeline control 10 allows the user to move through the time sequence of the animation so work on any scenic element can be performed at any specific time portion of the animation sequence. The Function Tabs 11 allow the user to vary the working window to display specific detailed tools and options of a particular phase of the scene creation process. The access to the DIALOGUE EDITING SCREEN, the second Main Component, requires the DIALOGUE Tab 12 (one of the Function Tab group 11) to be selected, and then the Expand/Contract icon 13 is clicked on.

The Main Screen shown in FIG. 1 may be varied considerably in the layout of the tools. Given this is a software user interface, it's assembly of components is not bound by physical connectedness or the design constraints of physics. Rather, the composition of components is predicated on software graphic user interface conventions as well as workflow ergonomics. Variations are infinite and not anticipated to affect the claims of uniqueness.

The Dialogue Editing Screen is the expanded display of all the tools and variables the user has to create and edit the dialogue. With the Dialogue Tab 12 selected, the user clicks on the Screen Expander 13 to shift to the second main component, the Dialogue Editing Screen. This screen also has Basic Operating System Tools 1, and the links to the Character Options 2 and Dictionary 3. Instead of the Main Screen View Screens and Controls 4, the Dialogue Editing Screen has Preview Windows 14 for two separate scene views (such as a group shot and a character close-up). Render controls 15 and Playback Controls 16 are positioned between the two Preview Windows 14 for ease of use. The Character Id. 17 identifies which character (of several possible in a scene) is being edited. Controls to further expand the screen and allow User to edit character speech and animation are the Phonetics 18, Volume 19, Musical Pitch 20, Speech Pace 21, Expression 22, and Gestures 23.

The Dialogue Line 24 is where the User enters dialogue as text input from a keyboard. The invention automatically displays the typed text in syllabic form, spelled phonetically, alternating syllables in the Ch.A Phonetic 25 and Ch. B Phonetic 26 display lines. The reason for separating the syllables on alternating lines is to allow the user capability of editing each syllable discretely, as a real speaking person does in vocalizing for dramatic effect. The user may stretch the duration of one syllable, while leaving the next intact, for example.

Figure 5:
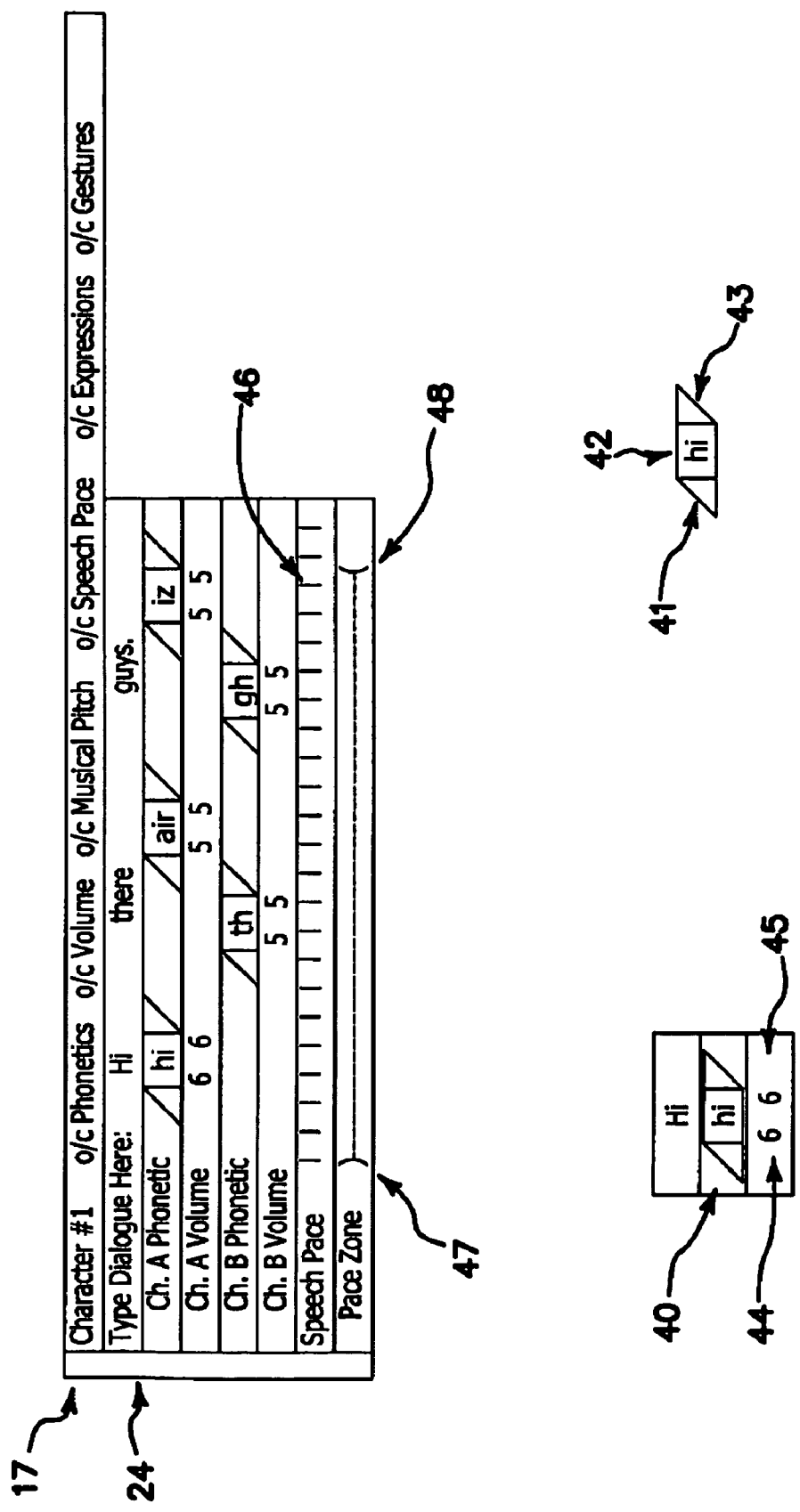
FIG. 5 is the Dialogue Editing tools detailed.
Figure 6:
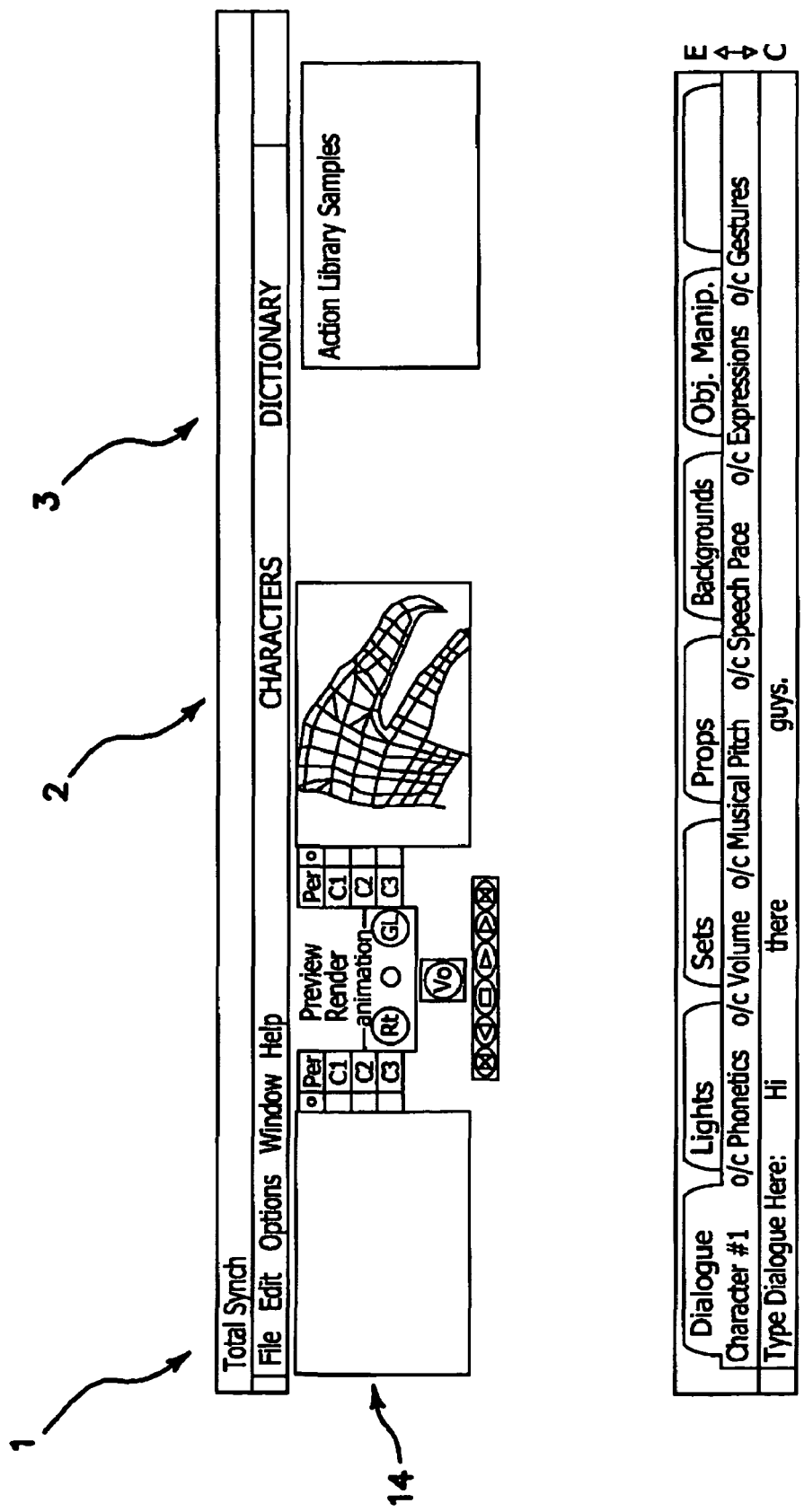
FIG. 6 is the Character Library Component.
Figure 6:
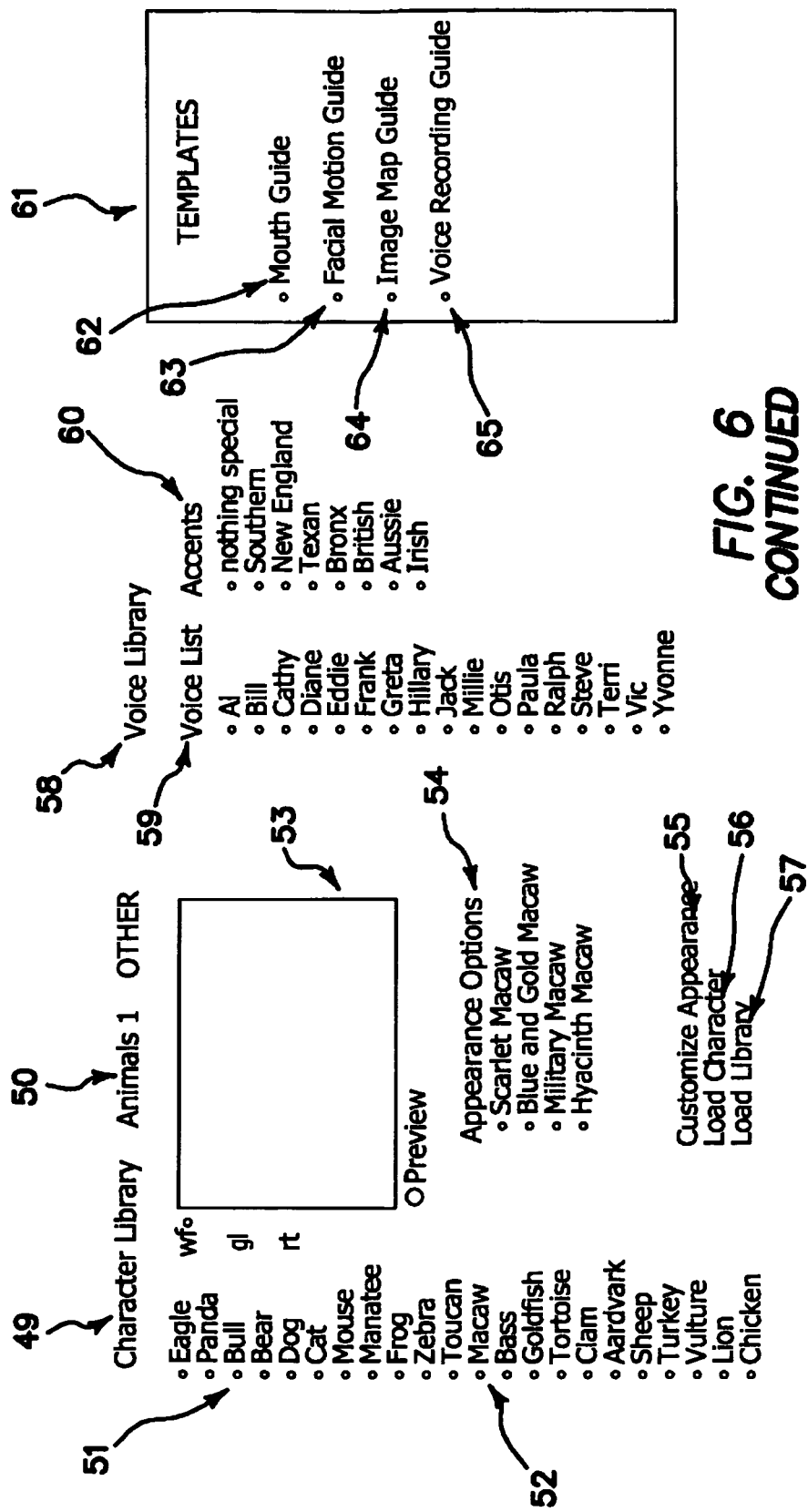
Figure 6:
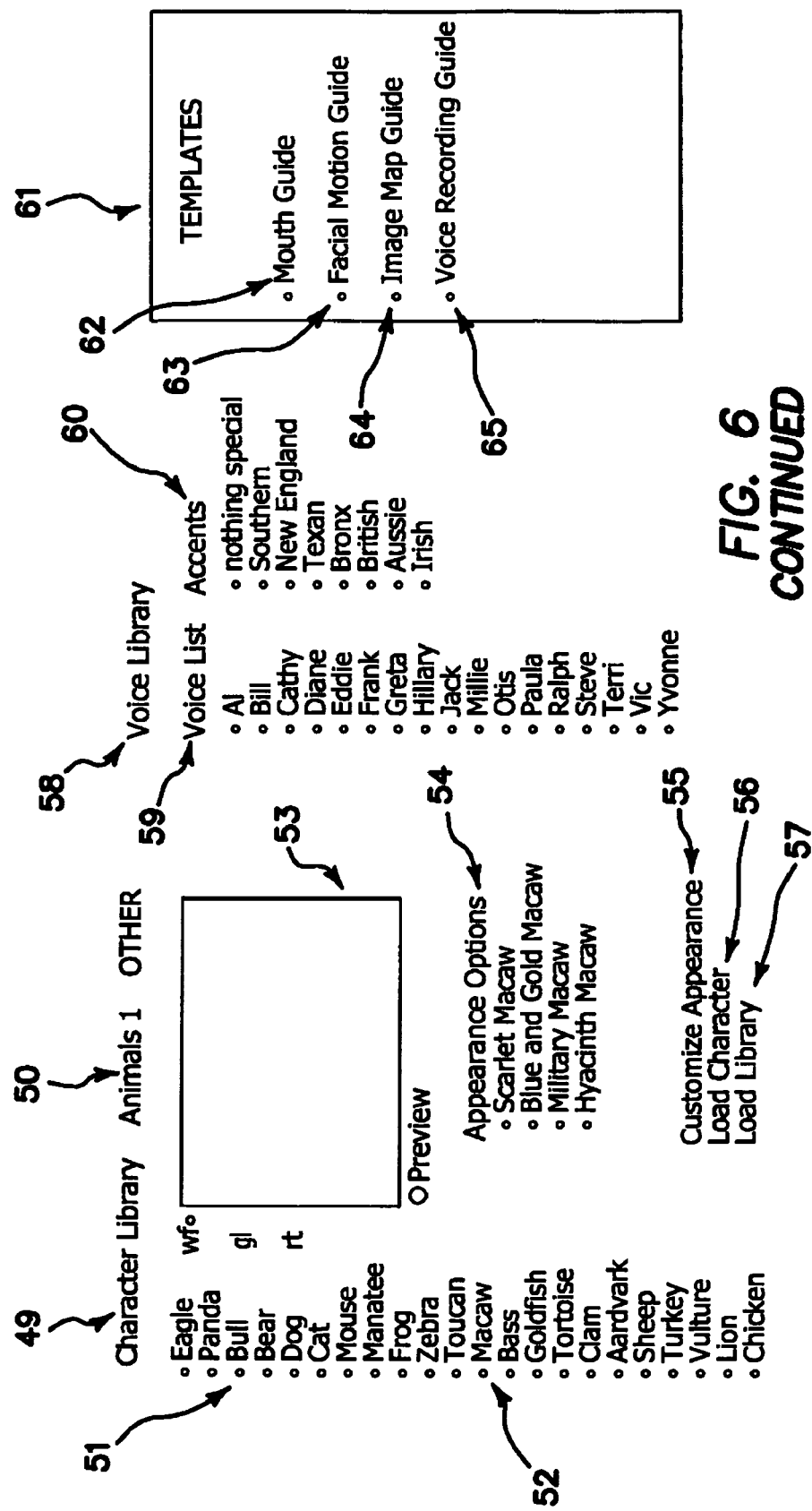
Figure 7:
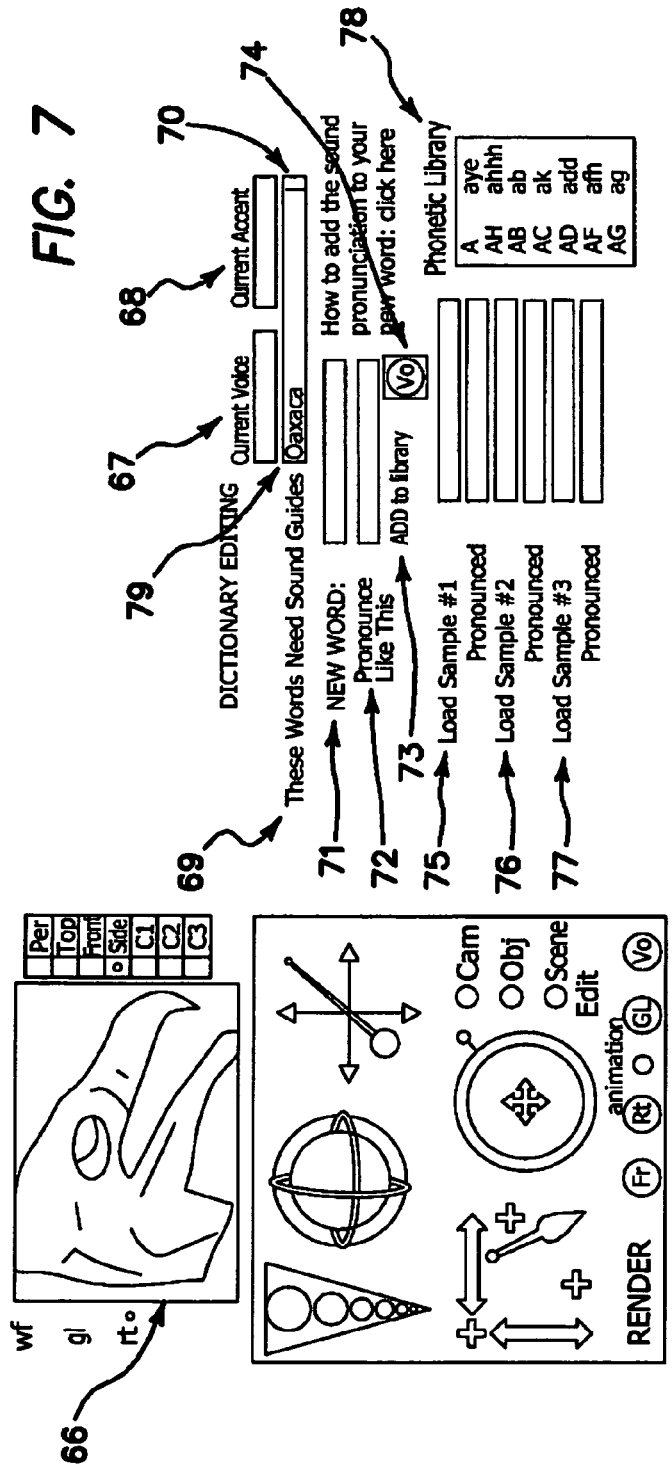
FIG. 7 is the Phonetic Dictionary Component.
Figure 8:
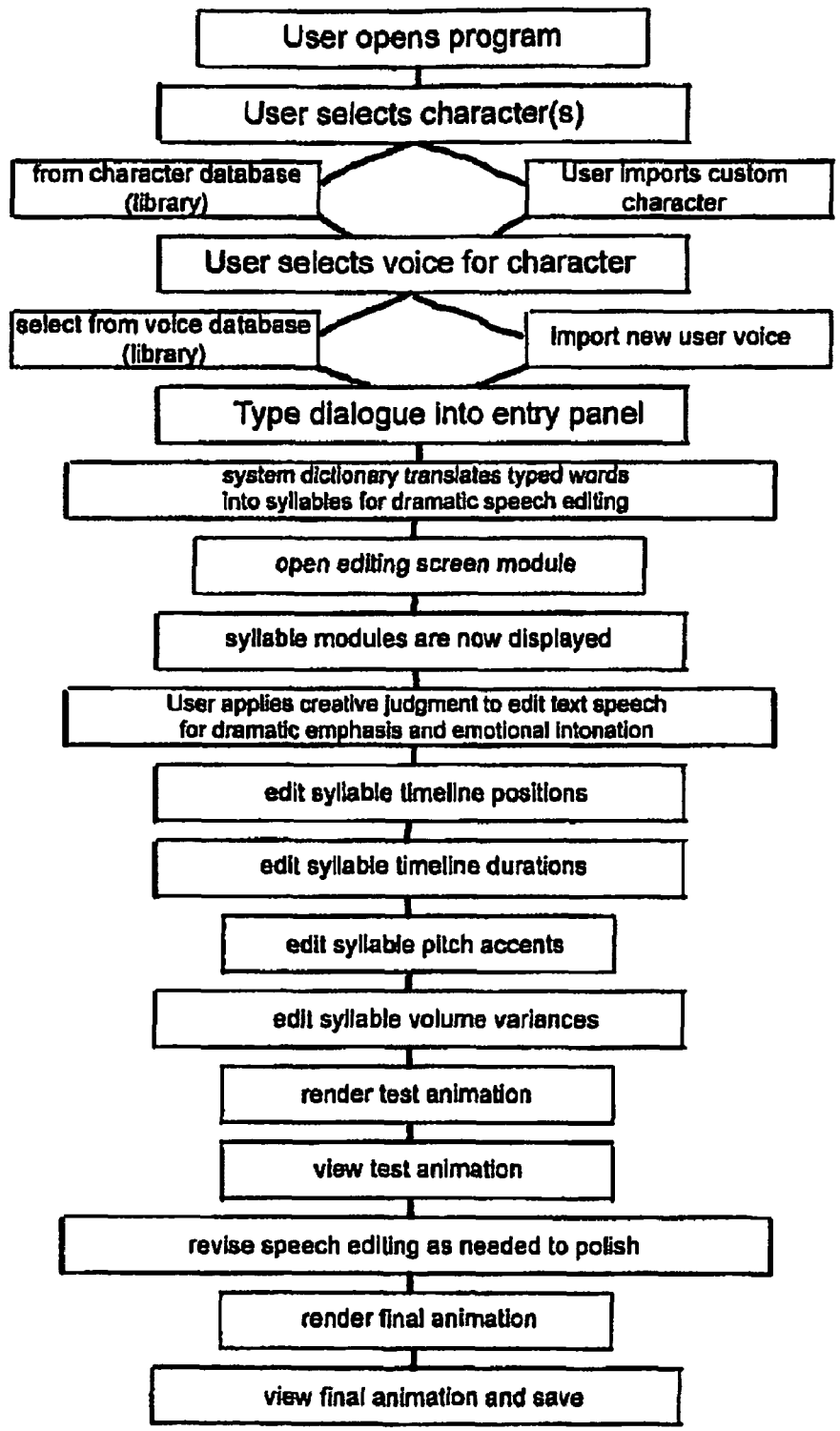
FIG. 8 is the overall operational schematic of the invention.
Figure 9:
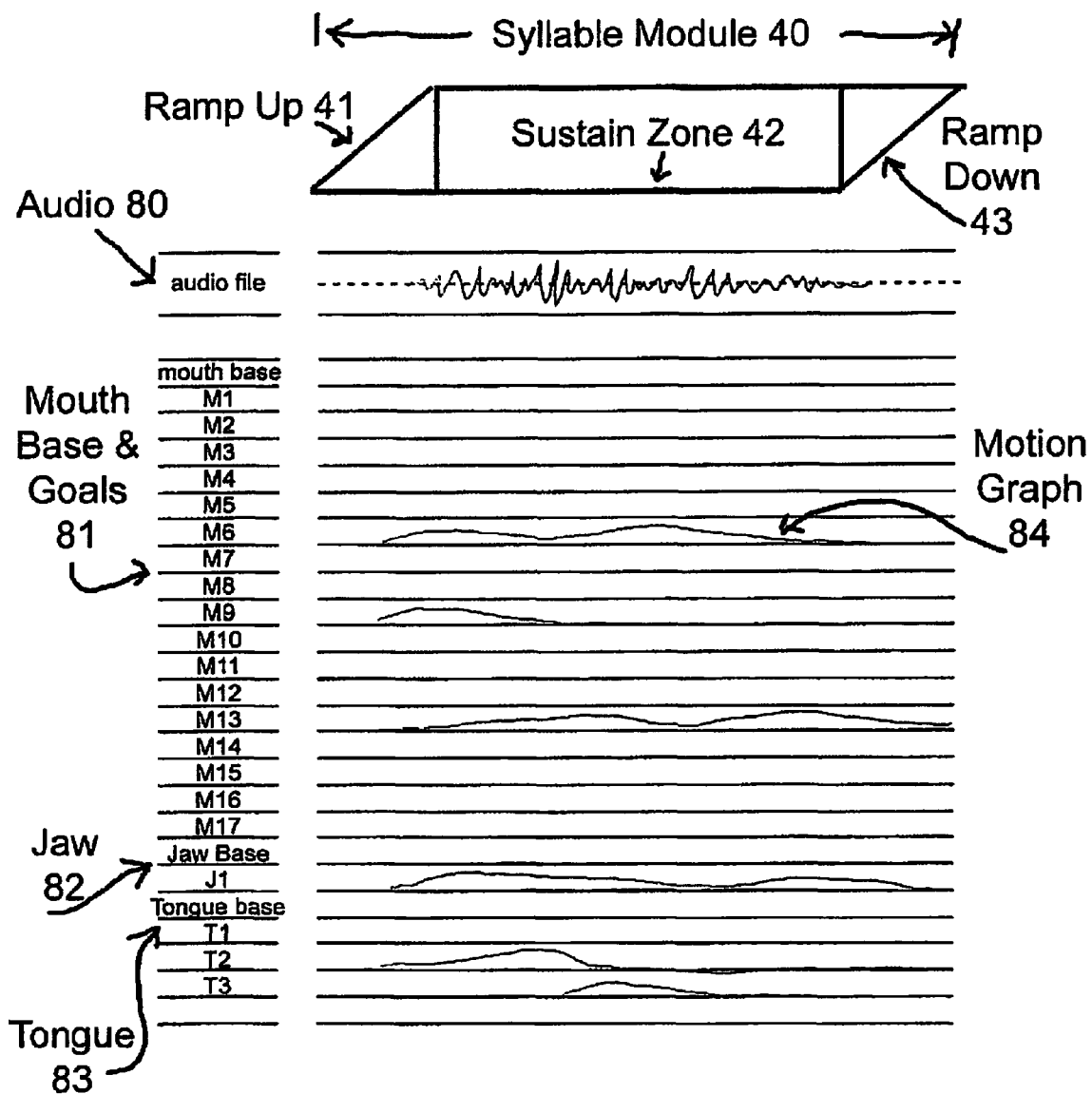
FIG. 9 is the syllabic module internal architecture.

Volume of each syllable is displayed in the CH. A Volume 27 and Ch. B Volume 28 lines. Speech Pace 29 indicates the relative duration of each syllable. Pace Zone 30 indicates the portion of the speech that is affected by an editing action. Mouth Expressions 31 is a line where non-vocal mouth animation (such as a smile) can be entered from the Action Library 37. The Eyes line 32 is where motions of the eyeballs and eyelids are added. The Eyebrows lines 33 and 34 (here shown expanded to each eyebrow can be controlled separately instead of both symmetrically moving) are where brow motions are added. Head Gestures 35 are where motions of the head are added. Neck Gestures 36 is where motions of the neck are added. All of these options are available for Character #2 38 and for Character #3 39. As illustrated in FIG. 5, the specialized parts of the Dialogue Editing Screen specifically related to the uniqueness of the invention and it's operation are the elements in the Dialogue Line 24, the Ch. A Phonetic 25, the Ch. A Volume 27, the Ch. B Phonetic 26, the Ch. B Volume 28, the Speech Pace 29 and Pace Zone 30.

A Syllabic module 40 is the invention's graphic representation of the envelope of both motion and sound for that specific portion of the dialogue. This Syllabic Module 40 has a Ramp Up 41, a Sustain Zone 42, and a Ramp Down 43. The ramps are those portions of the module where one will overlap and blend into the next if the syllables are within a single word, producing a fluid speech of the entire word. A syllable embodying an entire word (a one syllable word) uses the ramps to blend any mouth expression (like a smile that may occur before or after a word) into the word motions themselves (the Sustain zone 42). Further, animation motion graph data in a Ramp Up 41 area may cause the mouth to posture itself to anticipate a sound, such as the manner that the mouth opens prior to speaking a word beginning with "H". The "H" sound can only be started after the mouth is actually open and ready. The Ramp Up 41 area of the Syllabic Module 40 may contain this anticipatory posture animation data.

Inside the Sustain Zone 42 is a phonetically spelled version of the syllable shown on the screen to allow the user to identify the specific module. Below the Syllabic Module are two Volume Settings, a Opening Volume Setting 44, and a Closing Volume Setting 45. The Volume settings for a Syllabic Module in Ch. A Phonetics 25 will always be in the Ch. A Volume line 27. Similarly, Volume Settings for a Syllabic Module in the Ch. B Phonetics line 26 will always be in the Ch. B Volume line 28. On the Speech Pace line 29, there are vertical bars used as Pace Edit Handles 46. In the Pace Zone line 30, there is a Zone Beginning, 47 and a Zone Ending 48 which together define the portion of the dialogue affected by any editing action of the Pace Edit Handles 46. Variations of this screen may include an audio import feature and display so audio tracks (of sound effects, for example) can be imported and integrated with the program dialogue generation in a controlled time and volume relationship. Additionally, a display of musical notes and standard musical notation may be displayed to enhance the Musical Pitch element 20.

The Character Options is the program component that allows users to select existing characters from a database supplied with the product, modify them, import new characters for use, and assign a specific voice to the character. From either the Main Screen Component or the Dialogue editing Component, the user can open the Character Options main component by clicking on Character 2 at the top right screen line. The Character Options display component replaces the Dialogue Editing portion of the screen leaving the components on top (the Basic Operating System Tools 1, the Character Options link 2, the Dictionary 3, the Preview Windows 14, Render Controls 15 and Playback Controls 16) intact. The Character Libraries section 49 has several library groups of characters listed, such as Animals 50. Activating Animals 50 will display a Pulldown Menu 51 of specific available characters. The MACAW Character 52 is shown selected. The Character Preview 53 then displays a visual image of the chosen character. Appearance Options 54 will list any variations of appearance available for the character. Example shown are four appearance options for types of Macaws. All use the same character geometry but have different surface colorations. Customize Appearance 55 allows the user to make alterations in the character appearance. Load Character 56 is a command to open the dialogue box that permits a specific character from an outside source to be brought into this program for use. Load Library 57 is a command for permitting a collection of characters to be brought into this program for use, and stored for reference as a library group. Voice Library 58 displays the list of human sampled voices currently in the program and available for use.

The Voice List 59 indicates the actual sampled voices. Accents 60 indicates the regional voice accent which the Phonetic Dictionary will apply in it's translation of the typed text into pronounced speech. Templates 61 are the group of devices that assist a user in creating new character, appearance or voice components for customized program use. Mouth Guides 62 are the references to lip postures the program uses to create lip animation. Facial Motion Guides 63 are the references to facial postures and expressions used for facial gesturing. Image Map Guides 64 are the paint templates that indicate how a set of image texture maps are used by the program and provide methods for the user to paint over the existing colors with new patterns or colors and have them correctly fit the geometry of the chosen character. Voice Recording Guides 65 are the templates that assist a user in recording a new human voice into the program in a manner that allows the voice to be successfully integrated with program use. Variations of this will be primarily the number of characters available to use, the number of voices available, and the organization of these options into familiar groupings.

The Phonetic Dictionary Editor is the component that assists users in adding new words to the program dictionary for use in this program. From any of the other three main component screens, clicking on Dictionary 3 will open the display of the Phonetic Dictionary Editor. This component allows the user to introduce new words to the program (such as company names and trademark product names, for example) and designate to the program how the typed words will be translated into both vocal and animation results. The Selected Character Display 66 allows the user to see the character whose dialogue is being processed. The Current Voice 67 displays the voice in use from the Voice Library. Current Accent 68 displays the accent designated by the user for the current character because accent affects pronunciation of the words.

The Unknown Word Prompt Line 69 displays any and all words that have been entered as dialogue text and which the program cannot find in it's phonetic dictionary. The word "Oaxaca" 79 is shown as an example, and is displayed here because in the Character #1 Dialogue Entry Line 24, the word "Oaxaca" 80 is highlighted in RED indicating the program has no phonetic translation of this word. The first of these words will be displayed in the window of 69 and the remainder of the unknown words can be seen and selected by clicking on the Pulldown List of Unknown Words 70. New Word Entry 71 is the panel where a user can introduce words in anticipation of their use, such as new fictional character names. The new word entered, or the unknown word displayed, can be given a pronunciation reference in the Pronunciation Entry 72 if the user is already familiar with the pronunciation syllables available and used by the program. A new user unsure of how a word is pronounced in this program process can use the samples, such as Sample Beginning 75 (which displays the word from the dictionary that has the most consecutive letters the same as the New Word starting from left to right), the Sample Ending 77 (which displays the word from the dictionary that has the most consecutive letters the same as the New Word starting from right to left, from end to beginning), and the Sample User Designated 76, which displays any word the user types in that may have phonetic parts similar to the New Word. The Phonetic Library 78 displays a list of all syllabic sounds the program uses to build words and a user can click/drag any syllable from this list into the New Word Pronunciation Entry 72 to assemble the syllabic modules that will result in the word spoken correctly. The Audio Test (AO) button 74 will assemble an audio example of all syllables entered in the Pronunciation Entry 72 and play it back for the user to hear how the designated pronunciation entry 72 will sound when spoken. If the spoken version is satisfactory, the ADD Command 73 will initiate the process of adding this new word and its pronunciation version to the library for program use.

The principle variation of this component is its adaptation to other languages, which will require different syllabic sound groups, a new dictionary and appropriate phonetic translation guides. The underlying operation principle will remain constant.

All connections of main and sub components of this invention one to another are based on software industry standard keyboard/cursor command actions upon a graphic user interface icon which allows all displayed tools, components or processes to be connected to one another. Variations of connections may occur by altering the software program code or programming language.

This invention, being a software product, obeys most conventional computer software basic operation processes and such processes will be described in industry standard terminology. The User opens the program and the Main Screen main component is displayed in a default mode of a new file or project absent of content. If the User desires to continue work on an existing project, the User will click on FILE from the Basic Operating System Tools 1 to get an OPEN FILE menu. This discussion will presume a new project is being initiated rather than an existing project being modified. The User starts a new project by selecting a character (or characters) to work with, by clicking on CHARACTERS 3 to go to the Character Options main component. It is displayed. The User will then open the various Character Libraries 49 and review the characters listed in the pulldown menu 51. Clicking on one listed character selects it. If there are options of appearance offered, as shown in Appearance Options 54, User can designate which option is preferred. The User then looks down the list of voices in the Voice Library 58 and selects one voice for the selected character. To see the chosen character speaking a standard reference line of dialogue in the designated voice, User will activate the Character Preview tools 53. If the User finds the chosen voice does not seem appropriate as spoken by the chosen character, User can select another voice and preview it. User can also assign any given voice a regional accent from the Accents List 60 and preview the chosen character speaking in the designated accent. If the User preferred to introduce a new character, new voice or modified character appearance to the program, that would be done with the Templates 61. Assuming the User is now satisfied with the character choice, appearance, voice and accent, clicking on the DIALOGUE TAB 12 returns the User to the Main Screen.

With the character now created and defined, the User will arrange the position of the character in the View Screens 4 by using the Object Manipulation Tools 5 that affect position, rotation and scale or size. Once the character is positioned in relation to any other characters or scenic elements, the Camera Manipulation Controls 6 are used to position the camera as desired for scenic composition. The User will now introduce dialogue for the selected character by clicking on the Dialogue Line 24 to activate it and then introduce the dialogue text by keyboard entry in conventional text format, writing in plain English what the character is to say. An animation of the chosen character speaking the typed dialogue can now be assembled by activating the Animation Render Controls 8, and then viewing the finished animation by using the Animation Playback Controls 9. However, the speech will most likely be bland and monotonous because the speech has not been edited for dramatic quality. To edit the speech, User clicks on the Screen Expander 13 to open the Dialogue Editing Screen main component. In the Dialogue Editing Screen main component, the User may open the editing options by clicking on any of the following: Phonetics 18, Volume 19, Musical Pitch 20, Speech Pace 21, Expressions 22 or Gestures 23.

Generally the four essential elements for dramatic speech are the Phonetics 18, Volume 19, Musical Pitch 20, and Speech Pace 21 and these four form one of the essential unique and superior aspects of this invention. Comparing our process with another prior art (Talkmaster, noted above in Prior Art), we will look at the word "Master". In the Talkmaster system, the word "master" is phonetically broken down into five phonemes, "m", "a", "s", "t", and "r". In our system, the word "master" is broken down into two syllabic modules, "mah" and "stir". Our breakdown is both in the structure of actual speech and in the syllabic form users will immediately and intuitively understand when they edit volume and pace of this word. Normal speech of this word might tend to give emphasis to the first syllable "Mah", so by our system, the volume of this syllable might be slightly increased from default level. You can also give a character quality to speaking this word by stretching the speech pace of the first syllable and allowing the volume to ascend on the Closing Volume Setting 45 for that syllable. The first syllable "mah" would be longer and of increasing volume, while the second syllable "stir" would be shorter and with a descending volume. Trying to do the same with a word broken into five parts would be counter-intuitive, cumbersome, and unnaturally inferior for a user.

Dramatic human speech is often given distinction by our conscious changes of musical pitch, even when the result is not singing but rather simply lyrical or melodic speaking. Some spoken emphasis is actually accomplished by shifts of pitch instead of shifts of volume or pace. A voice reflecting an angered or apprehensive emotion might lower the pitch of the spoken works, a linguistic quality generally described as a "gruff voice" (Gruff defined in The Random House Dictionary as "low and harsh"). An example is a person saying "Yes?" as a way of inquiring why another person is bothering him, and is displeased with the intrusion. Saying "Yes" in a normal pitch for that character voice would not convey displeasure. Lowering the pitch of that word will generally convey the displeasure. In this invention, voices are sampled from real persons, taking each syllabic module our program needs from the recorded sampled speech. That sampled voice has a certain natural pitch, a quality of high or low frequency for the average tonality, which generally can be equated with a musical note. Once that sampled speech is digitized, the program uses the natural pitch of that voice as the default pitch. The Musical Pitch 20 editing line of the program allows the user to pitch-shift the Syllabic Module 40, by a plus-or-minus numeric variable, and the digital voice sample is raised or lowered in pitch according to existent musical/audio technology processes. Our uniqueness herein is not new pitch-shifting audio technology, but rather the integration of this existent technology within our user interface as a simple and intuitive control that combines with the editing of volume and pace as the natural, conscious and easily understood processes of creating dramatic speech.

Returning to the operation of our invention, the program displays the typed dialogue from the Dialogue Line 24 in syllabic phonetic segments and further alternates these syllabic components on the Ch. A Phonetic Line 25 and the Ch. B Phonetic Line 26. The blend of sound from one syllable to the next, from Ch. A to Ch. B, is superior by this arrangement, as compared to arranging sounds in consecutive order on one audio line that prevents overlap of sounds. A/B overlapping and blending insures maximum flexibility in mixing the volume and speech pace of the sounds, because each Syllabic Module 40 has a Ramp Up 41 (the element fades in to full strength), a Sustain Zone 42 (where the element endures at full strength), and a Ramp Down 43 (where the element's strength fades to zero). Syllables from the same word must seamlessly blend one into the next, so the Ramp Down 43 of one syllabic Module 40 overlaps in time the Ramp Up 41 of the next Syllabic Module. Thus one syllabic sound in a word seamlessly blends into the next to produce fluent speech.

Where words are separated in the Dialogue Line 24 text by a space, the program allows the last syllable before a space to ramp down to zero with no blend to the next syllable, and the first syllable after the space ramps up only after the prior syllable fully ramped down. This results in the natural spacing of momentary silence between words that fluent speech requires. Testing the character speech as an animated audio and video compilation is done by using the Animation Render Controls 8. If any of the text entered on the Dialogue Line 24 is not found in the Phonetic Dictionary main component, those words will be displayed in red colored text and the User will be prompted to enter the Dictionary main component to create phonetic translations.

Clicking on Dictionary 3 will open the Phonetic Dictionary main component. All words without a phonetic translation in the dictionary will be displayed in the Unknown Word Prompt 69. The User may enter syllabic groups directly into the Pronunciation Entry 72 or can drag and drop syllables from the samples shown in the Sample Beginning 76, the Sample Ending 78, and the Sample User Designated 77. Once all words are phonetically defined, the User can go back to the Dialogue Editing Screen main component to edit the speech and hear the audio assembly of the edits.

Dramatic editing of speech for realistic and entertaining results requires the variation of volume, pace and emphasis, but the user must be able to operate at the syllable level, as this invention allows and prior art does not. Each Syllable Module 40 has two volume settings, an Opening Volume Setting 44 and a Closing Volume Setting 45. By default they are the same and set at "5", which is a midpoint volume in the potential of 1-10. Users may increase the volume value of both of each individually, for effect. Some speech dramatically emphasizes one syllable louder than another, and this tool allows for that. Another dramatic speech effect has the volume rising or diminishing through the duration of a word, and the potential of setting different values for the Opening 44 and Closing 45 portions of a Syllabic Module Volume 40 creates this dramatic speech result.

Editing Speech Pace 21 further enhances the dramatic realism and quality of the speech. The User opens the Speech Pace component 21 and the Speech Pace line 29 and the Pace Zone line 30 are displayed. The User then sets the Pace Zone 30 to include only the portion of the dialogue text which requires adjustment, by click/dragging either the Zone Beginning icon 47 or the Zone Ending icon 48 to enclose only those portions of the dialogue to be edited. Once the Pace Zone 30 is defined, the User click/drags any Pace Edit Handle 46 in the Pace Zone 30 to expand or contract a portion of the Zone, resulting in lengthening or shortening the pace of the dialogue enclosed in the Zone. Combinations of varying volume and varying pace within a spoken passage result in the dramatic and realistic speech qualities that give characters a lifelike quality.

Prior art does have some of the stated capabilities, such as time shift and pitch shift, but the prior art allows only these features to be applied globally, meaning over the entire speech with uniform effect (making the entire speech longer or shorter, higher or lower pitch), but a global adjustment does not enhance or substantially alter the dramatic speech presentation. Only a technology that allows such dramatic speech tools as time shift, pitch shift, and volume adjustments, all to be operated at the syllable level, will yield a superior result to prior art. This invention contains this capability.

Now to the internal architecture of the syllable module 40.

A syllabic module contains two forms of data, an audio wave form file 80 representing a spoken syllable of human speech, and a set of motion graphs 84 representing mouth 81, jaw 82, and tongue postures 83 or positions. The audio wave file does not represent any new technology in itself. It is simply a digital recording of a brief human speech sound (the syllable). The motion graphs of themselves also are existent technology in themselves, but will be described for reference to the uniqueness that follows.

Figure 11:
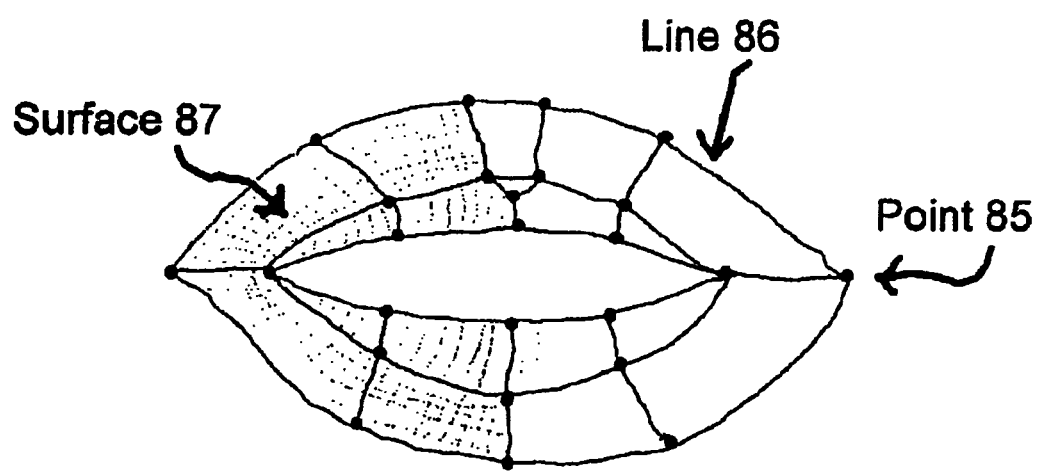
FIG. 11 is the structure of a mesh object that forms a digital character skin, and provides the mechanical components for achieving animation

Shown in FIG. 11, a digital character is actually a mesh surface 87 determined by a series of points 85, each with a fixed XYZ position coordinate in digital 3D space, and the surface is determined by interpolating lines of curvature 86 from point to point and then solid surfaces 87 interpolated from those curved lines. So in essence, the XYZ location of the points determines the final shape of the mesh surface (the character's "skin" so to speak).

Various deformed shapes of the mesh (the character's skin) are determined, as goals, and the XYZ location of the points are catalogued in a dataset. If you have one original shape and one goal shape, the percentage of blend from base shape to goal shape can determine any specific mouth shape between the two extremes. A motion graph represents the varying percentages of blend over a specified time duration.

But for complex motions, it may be arranged so there are multiple goals, and multiple motion graphs, and the animation process takes these multiple goal positions for each point in the mesh and blends them based on the percentages of each graph. So using multiple motion graphs to blend multiple goal shapes results in the greatest range of motions and the most realistic animation replicating real human motion.

This embodiment of the invention uses 24 shape goals, including the mouth (1 base shape and 17 goal shapes), the jaw position (1 base position and 1 goal position), and tongue position (1 base position and 3 goal positions), although more goals are both technically attainable and may be arbitrarily added, for non-human character mouth shapes.

It should be noted at this point that only a system which independently controls the mouth (lip) shapes, the jaw rotation (open or closed) and the tongue postures, as separate entities, may replicate human speech motions in a digital character with superlative, natural appearing results. All prior art lacks this capability in the Category B and C product types, including Bellomo and Major.

The syllable module 40 contains these motion graphs 84 for all the above described goals (although only three to five may be operative for any given syllable) and these motion graphs, once verified as perfectly producing mouth motions realistically and synchronously matching the audio file's syllable of speech, are interlocked in the module so all subsequent operations upon them (position in timeline, duration, volume, pitch shift, etc.) are equally and synchronously applied to the audio and the motion graphs.

Figure 10:
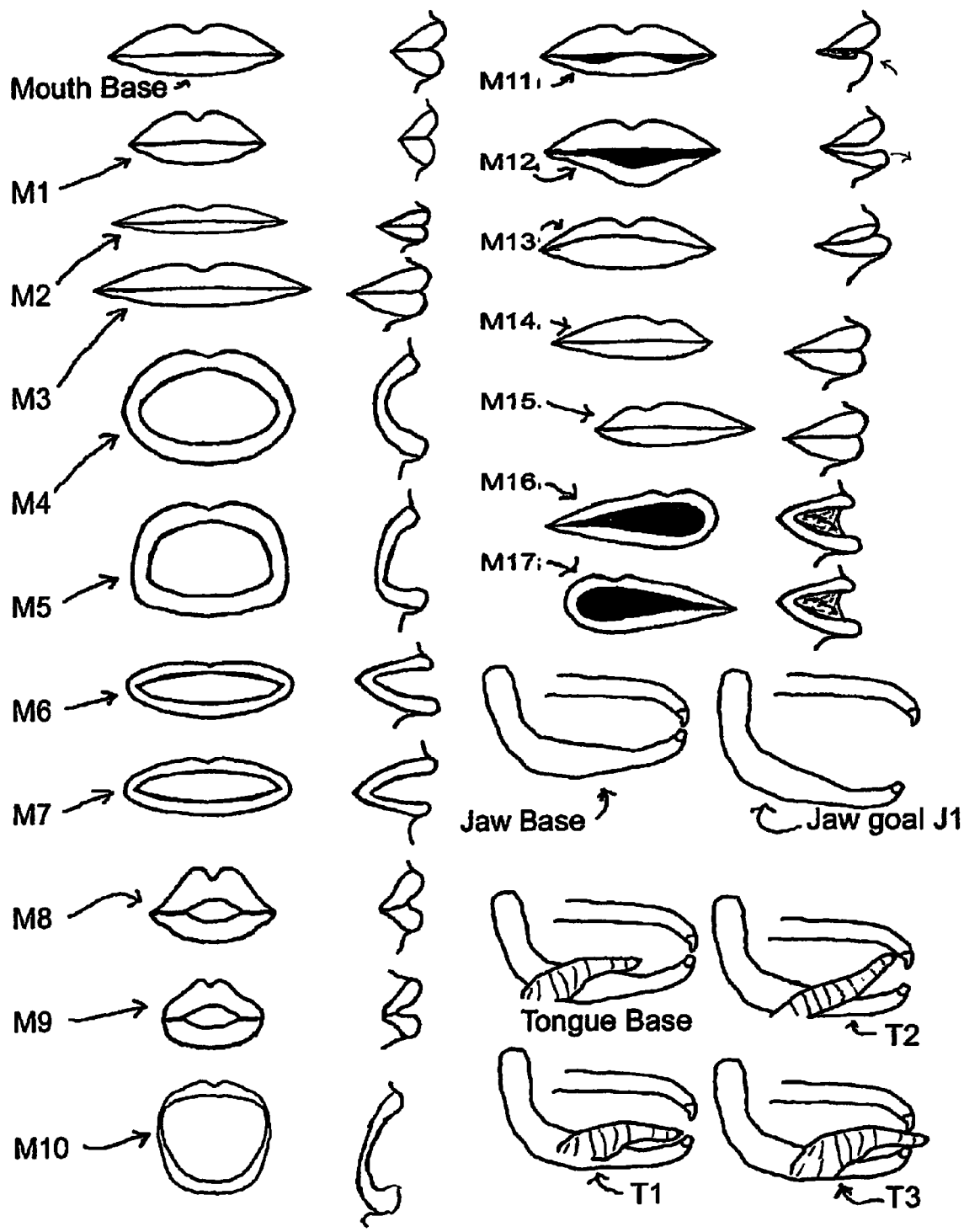
FIG. 10 is the mouth shapes that the motion graphs blend to achieve all variations of mouth shape.

The inventory of mouth, jaw, and tongue goal shapes are illustrated in FIG. 10, and listed with description in FIG. 10A.

If more than one character is utilized in this project, the second character is defined and programmed to talk by the same process outlined above for the first character. Once the character animation and dialogue are finalized, the Animation Render Controls 8 provide the tools for actually creating the animation in a standardized digital media audio/video file format for viewing within this application or export to be used in other digital audio/video editing and viewing programs.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the Accordingly, although an exemplary embodiment of the invention has been shown and described, it is to be understood that all the terms used herein are descriptive rather than limiting, and that many changes, modifications, and substitutions may be made by one having ordinary skill in the art without departing from the spirit and scope of the invention.

What is claimed is:

1. A character animation and speech tool, comprising:
   a character library, comprising an assortment of characters, each character being capable of being rendered lifelike by computer graphic rendering image generation, and being fully interchangeable among the library assortment in relation to all other characters;
   a sampled human voice library, comprising one or more of male, female, child, and exaggerated human caricature voice samples, each voice sample being standardized in sampling modules and time duration, each of said voice samples being fully interchangeable among the library assortment in relation to all other of said voice samples, and fully integrated therewith;
   a text-to-speech assembly apparatus, whereby any word text entered by a keyboard into the application is translated to its syllabic components and both a voice syllabic component and an animation motion graph data component are introduced into an assembly timeline for editing;
   a syllabic speech editing apparatus, wherein all entered text words may be edited with respect to volume, pace and pitch in syllabic units consistent with natural speech patterns and conscious human speech logic; and
   an animation assembly apparatus, whereby the edited animation motion graph data components drive the character to create facial motions consistent with natural speech, and each edited voice syllabic component is simultaneously assembled into a composite audio speech track fully synchronized with character facial motions;
   wherein said speech tool operates at a syllable level of speech manipulation, both in its internal architecture and at its user tool set, thereby replicating natural human choices in giving dramatic emphasis and clear enunciation in speech presentations.

2. The animation and speech tool as recited in claim 1, wherein said tool utilizes full motion graphed modules.

3. The animation and speech tool as recited in claim 1, wherein editing is performed by a user at the syllable level.

4. The animation and speech tool as recited in claim 1, wherein said tool further comprises an internal dictionary, said internal dictionary including an accent module for breaking down a word into correct syllables so that proper accented speech pronunciation results.

5. The animation and speech tool as recited in claim 1, and further comprising separate controls for animation of the mouth (lips), jaw, and tongue, as independent physiological entities, thereby correctly replicating real human physiology.

6. The animation and speech tool as recited in claim 1, wherein said tool has a capability to create both laterally and vertically asymmetrical mouth postures, for correctly replicating real human physiology and speech motion patterns.

7. A character animation and speech tool comprising:
   a character library, comprising an assortment of character being capable of being rendered lifelike by computer graphic rendering image generation, and being fully interchangeable among the library assortment in relation to all other characters;
   a sampled human voice library, comprising one or more of male, female, child, and exaggerated human caricature voice samples, each voice sample being standardized in sampling modules and time duration, each of said voice samples being fully interchangeable among the library assortment in relation to all other of said voice samples, and fully integrated therewith;
   a text-to-speech assembly apparatus, whereby any word text entered by a keyboard into the application is translated to its syllabic components and both a voice syllabic component and an animation motion graph data component are introduced into an assembly timeline for editing; and
   an internal dictionary, said internal dictionary including an accent module for breaking down a word into correct syllables so that proper accented speech pronunciation results;
   wherein said tool has a capacity to permit change of actual words to be spoken in an animation sequence, during the creation of said animation sequence, without the need to re-record any audio files.

8. The animation and speech tool as recited in claim 7, wherein said tool utilizes full motion graphed modules.

9. The animation and speech tool as recited in claim 7, wherein editing is performed by a user at the syllable level.

10. The animation and speech tool as recited in claim 7, and further comprising separate controls for animation of the mouth (lips), jaw, and tongue, as independent physiological entities, thereby correctly replicating real human physiology.

11. The animation and speech tool as recited in claim 7, wherein said tool has a capability to create both laterally and vertically asymmetrical mouth postures, for correctly replicating real human physiology and speech motion patterns.

12. A character animation and speech tool comprising:
   a character library, comprising an assortment of character being capable of being rendered lifelike by computer graphic rendering image generation, and being fully interchangeable among the library assortment in relation to all other characters;
   a sampled human voice library, comprising one or more of male, female, child, and exaggerated human caricature voice samples, each voice sample being standardized in sampling modules and time duration, each of said voice samples being fully interchangeable among the library assortment in relation to all other of said voice samples, and fully integrated therewith;
   a text-to-speech assembly apparatus, whereby any word text entered by a keyboard into the application is translated to its syllabic components and both a voice syllabic component and an animation motion graph data component are introduced into an assembly timeline for editing; and
   complete motion graphs of lip synch animation married to sound modules of spoken syllables of speech;
   wherein an animation sequence can be created with substantially perfect synchronization between the lip movement of a selected character and accompanying words spoken by the character on an accompanying sound track.

* * * * *